United States Patent
Karmiy et al.

(10) Patent No.: US 6,944,522 B2
(45) Date of Patent: Sep. 13, 2005

(54) CHEMICAL PROCESS MACHINE PROGRAMMING SYSTEM

(75) Inventors: Leo Karmiy, Newton Center, MA (US); Bradley Wolk, Montara, CA (US); Cristopher Petersen, Amherst, NH (US)

(73) Assignees: Millipore Corporation, Billerica, MA (US); Genentech, Inc., South San Francisco, CA (US)

(*) Notice: Subject to any disclaimer, the term of this patent is extended or adjusted under 35 U.S.C. 154(b) by 314 days.

(21) Appl. No.: 10/264,924

(22) Filed: Oct. 4, 2002

(65) Prior Publication Data

US 2003/0069650 A1 Apr. 10, 2003

Related U.S. Application Data

(60) Provisional application No. 60/327,914, filed on Oct. 9, 2001.

(51) Int. Cl.[7] .............................................. G05B 21/00
(52) U.S. Cl. ...................... 700/273; 210/650; 210/656; 435/297.1; 436/161
(58) Field of Search .......................... 210/85, 141, 143, 210/198.2, 650, 656; 422/70; 435/297.1; 436/161; 700/12, 18, 23, 83, 273; 345/350, 352, 764, 771, 853, 854, 855, 522, 965

(56) References Cited

U.S. PATENT DOCUMENTS

| | | | | |
|---|---|---|---|---|
| 4,595,496 A | | 6/1986 | Carson | 210/101 |
| 4,679,137 A | * | 7/1987 | Lane et al. | 700/83 |
| 4,873,623 A | * | 10/1989 | Lane et al. | 700/83 |
| 4,953,075 A | * | 8/1990 | Nau et al. | 700/17 |
| 5,029,065 A | * | 7/1991 | Nau et al. | 700/17 |
| 5,576,946 A | * | 11/1996 | Bender et al. | 700/17 |
| 5,597,486 A | | 1/1997 | Lutz | 210/639 |
| 5,712,654 A | * | 1/1998 | Kawashima et al. | 715/500.1 |
| 5,726,898 A | | 3/1998 | Jacobs | 364/479.01 |
| 5,818,711 A | | 10/1998 | Schwabe et al. | 364/147 |
| 5,940,294 A | * | 8/1999 | Dove | 700/83 |
| 6,029,101 A | * | 2/2000 | Yoshida et al. | 700/266 |
| 6,078,320 A | * | 6/2000 | Dove et al. | 345/866 |
| 6,181,340 B1 | * | 1/2001 | Alimpich et al. | 345/821 |
| 6,269,299 B1 | | 7/2001 | Blotenberg | 701/100 |
| 6,369,841 B1 | * | 4/2002 | Salomon et al. | 345/854 |
| 6,415,193 B1 | * | 7/2002 | Betawar et al. | 700/97 |
| 6,571,133 B1 | * | 5/2003 | Mandl et al. | 700/18 |
| 6,629,003 B1 | * | 9/2003 | Frizzell et al. | 700/97 |
| 6,690,981 B1 | * | 2/2004 | Kawachi et al. | 700/83 |

FOREIGN PATENT DOCUMENTS

| | | | | |
|---|---|---|---|---|
| DE | 19816287 | 4/1999 | | B60T/8/60 |
| WO | WO 99/22850 | 5/1999 | | B01D/65/08 |
| WO | WO 00/63757 | 10/2000 | | G05D/7/06 |
| WO | WO 00/68750 | 11/2000 | | G05D/19/418 |
| WO | WO 01/04715 | 1/2001 | | G05D/7/06 |

OTHER PUBLICATIONS

PCT International Search Report for PCT/US02/31885 (Forms PCT/ISA/210 and 220)(mailed Nov. 9, 2003).

* cited by examiner

*Primary Examiner*—Anthony Knight
*Assistant Examiner*—Ronald D Hartman, Jr.
(74) *Attorney, Agent, or Firm*—John Dana Hubbard

(57) ABSTRACT

The present invention provides an operation editor that includes a user interface for programming operations to be performed by a chemical process machine. Through the user interface the user may specify that one or more of the steps in an operation be variable. Such variable steps may subsequently be edited by the same or another user when the operation is incorporated into a procedure. Steps in the operation that are not variable are fixed and may not be edited when the operation has been incorporated into a procedure. Furthermore, individual fields in a variable step may be either variable or fixed. The present invention also provides a procedure editor that includes a user interface, which allows the user to edit variable steps within the procedure's operations. The procedure editor presents to the user for editing only those steps within the procedure that are variable.

20 Claims, 6 Drawing Sheets ically require the end user to manually input each step in the
CHEMICAL PROCESS MACHINE PROGRAMMING SYSTEM This application claims the benefit of Provisional U.S. Patent Application Ser. No. 60/327,914, filed Oct. 9, 2001.

CROSS REFERENCE TO RELATED APPLICATIONS

This application is related to the commonly owned U.S. Prov. Pat. App. Ser. No. 60/327,914, filed on Oct. 9, 2001 by Cris Petersen, entitled "Automated Fluid Filtration System for Conducting Fluid Separation Processes, and for Acquiring and Recording Data Thereabout", and which is hereby incorporated by reference in its entirety.

BACKGROUND

1. Field of the Invention

The present invention relates to control of chemical process machines and, more particularly, to improved techniques for generating instructions to control chemical process machines.

2. Related Art

Various devices have been developed for processing biochemical substances. Such devices, referred to herein generically as "chemical process machines," have found particular utility in the biotechnology industry for the purpose of facilitating the research, development, and production of pharmaceuticals. Chemical process machines may, for example, be used when a particular drug is being researched in the lab, subsequently when the drug is being tested during a pilot program, and/or when the drug is being produced in large quantities for commercial manufacture and distribution.

Chemical process machines are typically capable of being programmed to perform a wide variety of actions associated with biochemical processing. Such actions often include mechanical actions (such as opening or closing valves), providing information to the machine operator about the current state of the process, obtaining input from the machine operator, and making decisions about which actions to perform next based on the existence of predetermined conditions. Chemical process machines are typically capable of being programmed to perform a particular sequence of such individual actions—referred to herein as "steps"—in a particular order to perform a particular process.

Performing such programming can be tedious, time-consuming, and error-prone. A single process may include hundreds or even thousands of individual steps. Programming a chemical process machine to perform such a process typically involves accurately specifying each of the steps to be performed in the desired order. Failure to program a particular step accurately or to program the desired steps in an appropriate order may cause the process to execute incorrectly or to fail to execute entirely. As a result, it can be difficult to quickly and accurately program a process that includes a large number of steps.

Some user interfaces have been developed to facilitate the practice of programming chemical process machines. Such user interfaces typically allow the programmer to program the desired sequence of steps using textual instructions that are input using a text editor, spreadsheet, or other similar software on a personal computer or workstation. Allowing steps in the process to be input in this way simplifies the task of programming the chemical process machine. Furthermore, the sequence of steps entered by the operator may be saved to a file for subsequent editing or other use.

Such conventional user interfaces for programming chemical process machines, however, have a variety of disadvantages. For example, such user interfaces typically require the end user to manually input each step in the process to be performed by the chemical process machine. This can be difficult and time-consuming, particularly in the case of processes that include hundreds or thousands of steps. Even when a process has been previously programmed and saved, conventional user interfaces typically display to a user who desires to edit one or more steps in the process a listing of all of the steps in the process. When faced with such a listing, the user is responsible for finding and selecting the particular step or steps in the process to be edited, potentially from among thousands of steps. As a result, even identifying the particular steps to be edited in a process can be time-consuming using the user interfaces typically provided for use with conventional chemical process machines.

Furthermore, in a typical process, there are often certain steps, which should not be edited by the user for a variety of reasons. For example, some steps (such as steps related to initialization of the chemical process machine) may be required by the process. As another example, it may be necessary to execute certain sequences of steps within the process in a particular order. The conventional user interfaces described above for programming chemical process machines, however, typically allow all steps in a process to be edited by the user. As a result, it is typically possible for the user to inadvertently cause a process to malfunction by either deleting necessary steps from the process or by incorrectly modifying steps in the process.

Some process machine programming user interfaces allow sequences of steps to be grouped together into modules that are referred to herein as "operations." Operations may further be combined into higher-level modules that are referred to herein as "recipe procedures" or simply as "procedures." Typically, each operation and each procedure is stored in a separate file in a computer file system. Each procedure file typically contains references to the files containing the operations that comprise the procedure. As a result, modifying a step in a particular operation file effectively results in modifying the step in every procedure that incorporates the operation. To avoid this problem and modify a step in only a single procedure, it is typically necessary to make a copy of the operation file containing the step and to then modify the step in the copy of the operation file. The copied operation file must typically be saved using a different filename than the original operation file. As a result, modifying individual steps in a variety of procedures typically leads to the undesirable proliferation of large numbers of similar, but not identical, operation files. It can be difficult to manage this large number of operation files and to subsequently identify the differences among them, particularly given the large numbers of steps each of them may contain and the small number of differences between different operation files.

What is needed, therefore, are simplified and more efficient techniques for programming chemical process machines.

SUMMARY

In one aspect, the present invention provides an operation editor that includes a user interface for programming operations to be performed by a chemical process machine. An operation includes a sequence of one or more steps. Through the user interface the user may specify that one or more of the steps in an operation be variable. Such variable steps may subsequently be edited by the same or another user when the operation is incorporated into a procedure. Steps in the operation that are not variable are fixed and may not be edited when the operation has been incorporated into a procedure. The operation editor may therefore be used to create operations that include both variable and fixed steps. Furthermore, individual fields in a variable step may be either variable or fixed.

In another aspect, the present invention provides a procedure editor that includes a user interface for programming procedures to be performed by a chemical process machine. A procedure includes a sequence of one or more operations (as defined above). Through the procedure editor's user interface, the user may select and arrange operations in a particular order within the procedure. The user may also use the user interface to edit variable steps within the procedure's operations. When a particular operation is selected by the user for editing, the procedure editor may display to the user only the variable steps in the operation and may allow the user to edit only the variable fields of the variable steps. The procedure editor may therefore be used to simplify the process of editing steps within procedures both by allowing the user to directly edit steps within the procedure's operations and by presenting to the user only those steps within the procedure that are variable.

Other features and advantages of various aspects and embodiments of the present invention will become apparent from the following description and from the claims.

DETAILED DESCRIPTION

In one aspect, the present invention provides an operation editor that includes a user interface for programming operations to be performed by a chemical process machine An operation includes a sequence of one or more steps. Through the user interface the user may specify that one or more of the steps in an operation be variable. Such variable steps may subsequently be edited by the same or another user when the operation is incorporated into a procedure. Steps in the operation that are not variable are fixed and may not be edited when the operation has been incorporated into a procedure. The operation editor may therefore be used to create operations that include both variable and fixed steps. Furthermore, individual fields in a variable step may be either variable or fixed.

In another aspect, the present invention provides a procedure editor that includes a user interface for programming procedures to be performed by a chemical process machine. A procedure includes a sequence of one or more operations (as defined above). Through the procedure editor's user interface, the user may select and arrange operations in a particular order within the procedure. The user may also use the user interface to edit variable steps within the procedure's operations. When a particular operation is selected by the user for editing, the procedure editor may display to the user only the variable steps in the operation and may allow the user to edit only the variable fields of the variable steps. The procedure editor may therefore be used to simplify the process of editing steps within procedures both by allowing the user to directly edit steps within the procedure's operations and by presenting to the user only those steps within the procedure that are variable.

Figure 1:
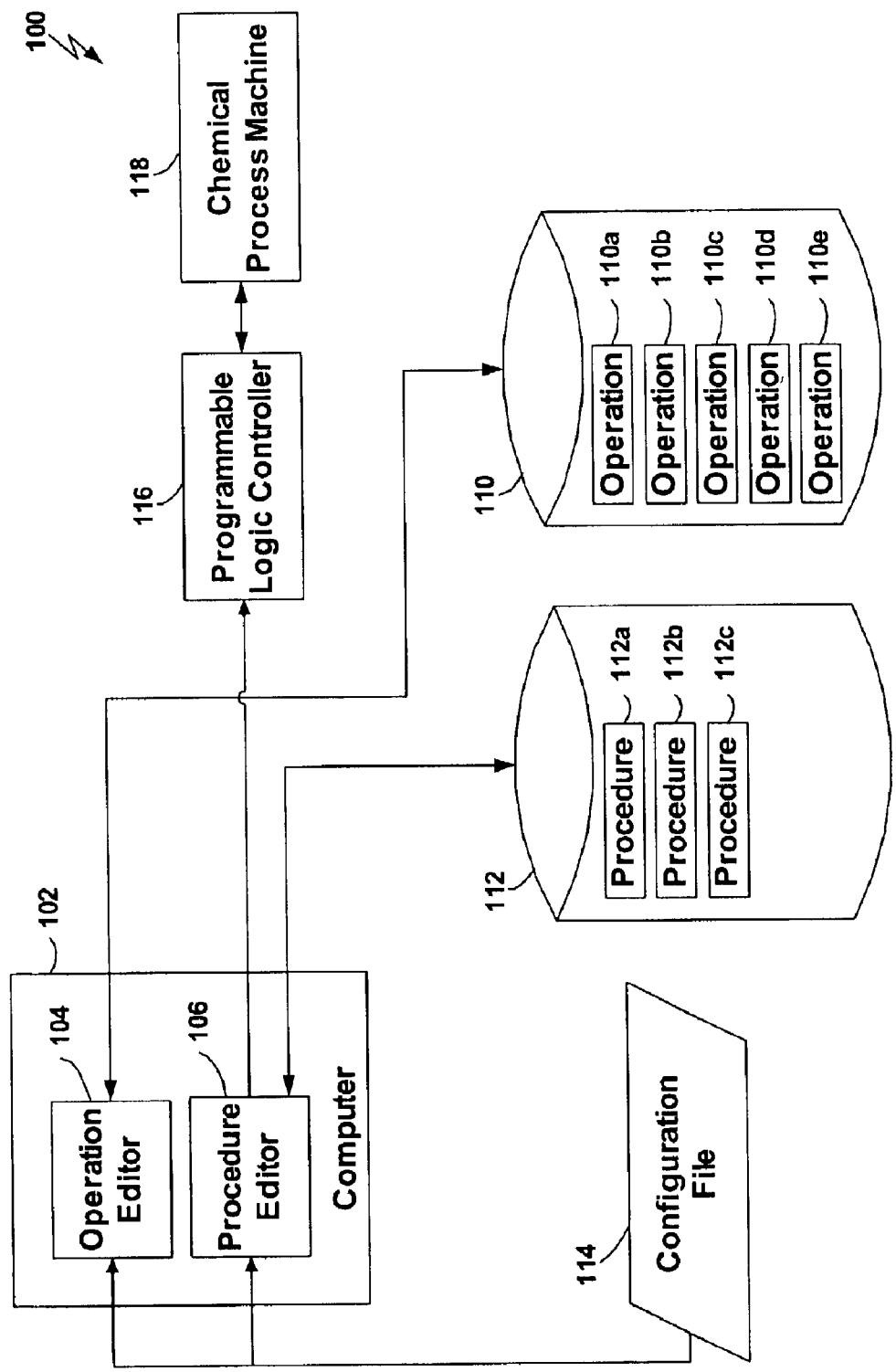
FIG. 1 is a block diagram of a system for controlling a chemical process machine according to one embodiment of the present invention.

Referring to FIG. 1, a system 100 for controlling a chemical process machine 118 is shown. The chemical process machine 118 may be any machine for processing biochemical substances, such as a machine for performing chromatography or tangential flow filtration (TFF). The system includes a computer 102, which may, for example, be any conventional desktop computer or workstation. The computer includes an operation editor 104 and a procedure editor 106 which may, for example, be implemented in software executing on the computer 102. Various embodiments of the operation editor 104 and the procedure editor 106 will be described in more detail below.

Figure 2:
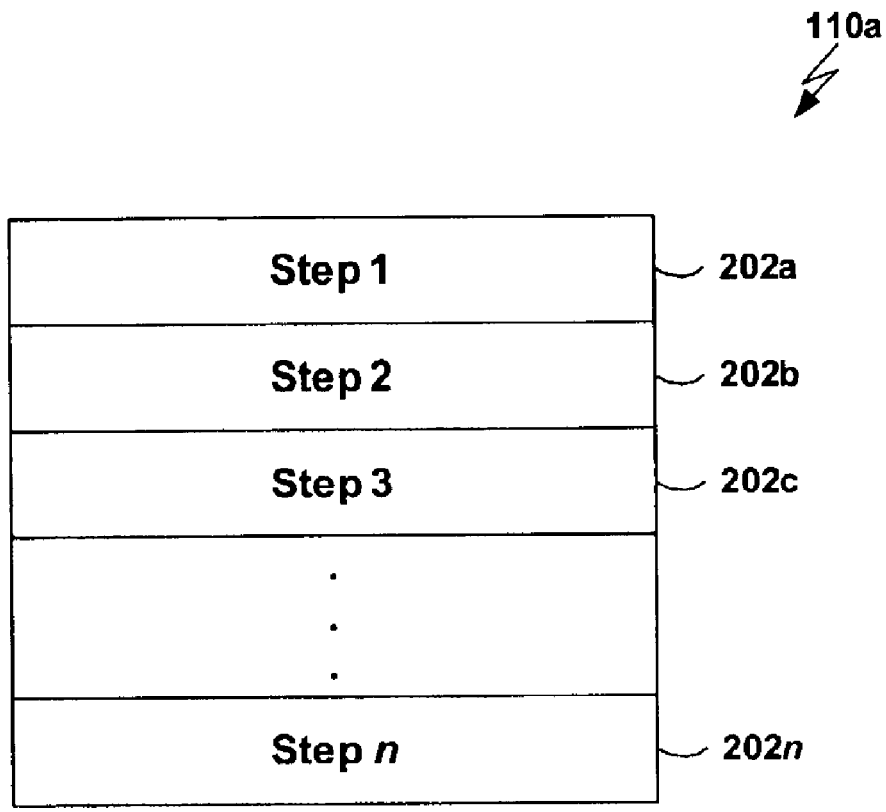
FIG. 2 is a block diagram of a data structure that is used to represent an operation according to one embodiment of the present invention.

The system 100 also includes a store of operations 110 (including operations 110a–e), a store of procedures 112 (including procedures 112a–c), and a configuration file 114. Each one of operations 110 includes a sequence of one or more steps that may be executed by a programmable logic controller 116 in conjunction with the control of the chemical process machine 118. For example, referring to FIG. 2, an example of the structure of operation 110a is shown in more detail. As shown in FIG. 2, operation 110a includes a sequence of n steps 202a–n. The number of steps n may be any number and is often in the hundreds or thousands. Different ones of the operations 110 may have different numbers of steps. Examples of the steps 202a–n are described in more detail below.

Each one of procedures 112 includes a sequence of one or more operations 110. As further described in more detail below, configuration file 114 contains information about how to translate steps contained in the operations 110 into instructions that may be executed by the programmable logic controller 116 to control the chemical process machine 118. When one of the procedures 112 is to be executed by the chemical process machine 118, the procedure editor 106 translates the steps in the procedure into appropriate instructions using the configuration file 114 and transmits the translated instructions to the programmable logic controller 116. The programmable logic controller 116 may then execute the instructions, thereby causing the chemical process machine 118 to carry out the steps in the selected procedure. It should be appreciated that although the programmable logic controller 116 is depicted as a distinct device from the chemical process machine 118, the programmable logic controller may be internal to the chemical process machine 118.

Figure 3:
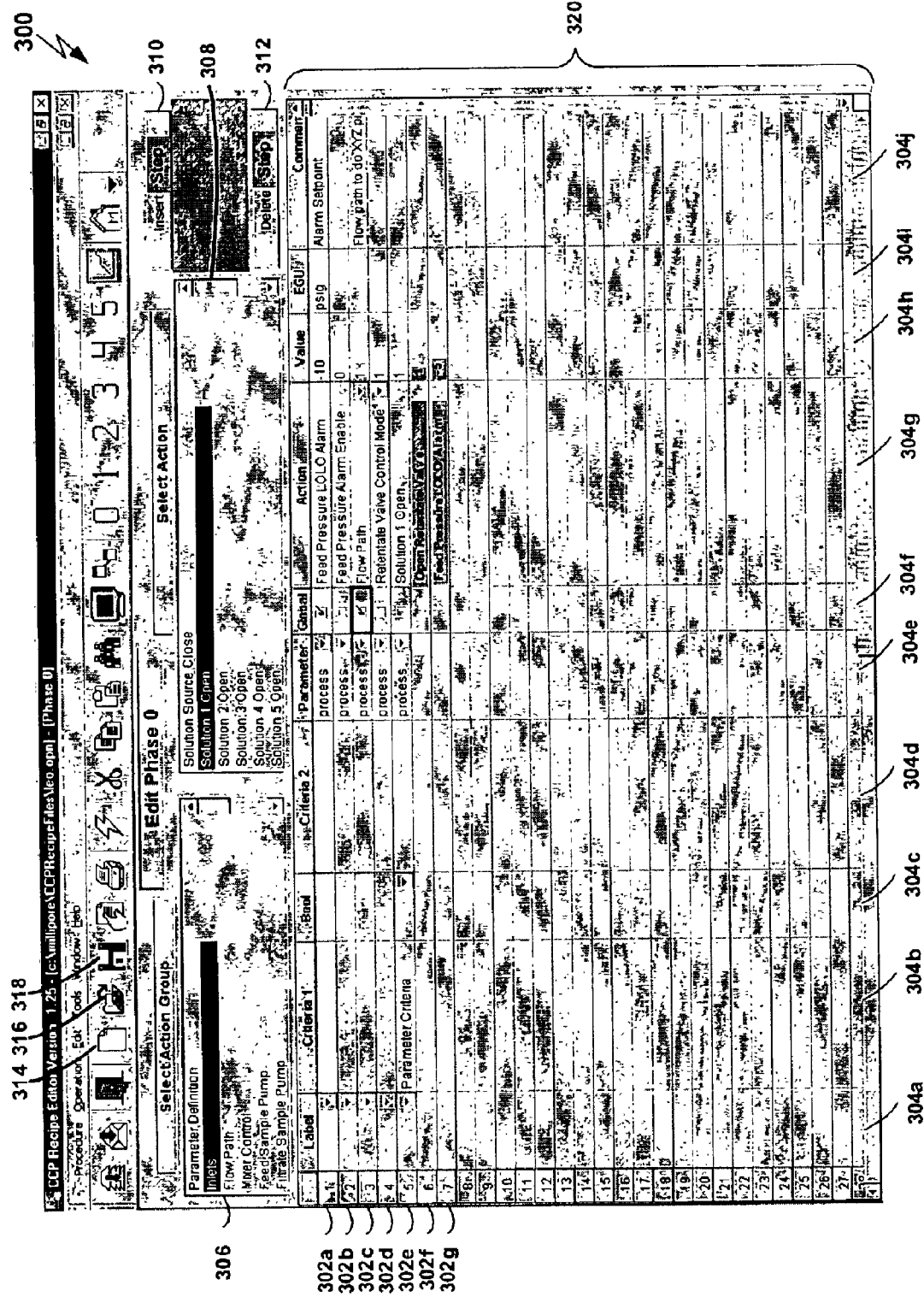
FIG. 3 is a diagram of a graphical user interface that is used by an operation editor according to one embodiment of the present invention.

In one embodiment of the present invention, the operation editor 104 provides a graphical user interface that a user of the computer 102 may use to edit the operations 110. Referring to FIG. 3, an example of such a user interface 300 is shown. In the example shown in FIG. 3, one of the operations 110 has already been selected for editing. As a result, the steps of the selected operation are shown in a region 320 of the user interface 300 that takes the form of a spreadsheet that includes rows 302a–g and columns 304a–j. Each of rows 302a–g represents a step in the selected operation and each of columns represents a field in the steps. As a results, rows 302a–g may be referred to below simply as "steps" and columns 304a–j may be referred to simply as "fields" for ease of reference.

Before describing the steps 302a–g in more detail, other aspects of the user interface 300 will be described. The user interface includes a button 314 for creating a new operation (i.e., for adding an empty operation to the operations 110 shown in FIG. 1), a button 316 for opening an existing one of the operations 110 for editing in the operation editor 104 using the user interface 300, and a button 318 for saving the operation that is currently being edited using the user interface 300. The operation that is currently being edited using the user interface 300 is referred to herein as the "current operation."

At any particular time, a particular one of the steps 302a–g may be selected by the user for editing. This selected step is referred to herein as the "current step." For example, as shown in FIG. 3, step 302a is highlighted to indicate that it is the current step. The user may select the current step in any of a number of ways, such as by clicking on the current step using a mouse or by using directional arrow keys on a computer keyboard. The user interface 300 includes an "Insert Step" button 310 for inserting a new step into the current operation at the position of the current step, and a "Delete Action" button 312 for deleting the current step from the current operation.

In this example, the current operation includes seven steps 302a–g. Each of the steps 302a–g includes ten fields 304a–j. Each of these fields 304a–j will now be described. The fields 304a–j will not be described in the order shown, but rather in an order that will simplify their explanation.

The "Action" field 304g of a step indicates the action to be performed by the step. Any of a variety of actions may be specified, depending on the particular chemical process machine to be controlled. For example, some actions may directly control mechanical components of the chemical process machine 118, such as by opening or closing valves. Other actions may put the chemical process machine 118 into a particular mode of operation, such as a flow control mode. Other actions may enable/disable alarms on the chemical process machine 118 or set alarm limits. Yet other actions may display prompts to the operator to inform the operator about the state of the process and/or to solicit input from the operator. Some actions may be conditional actions, which will only be executed if certain criteria are satisfied. It should be appreciated that these kinds of actions are provided merely for illustrative purposes and do not constitute limitations of the present invention. Rather, different chemical process may perform different actions and embodiments of the present invention are not limited to being used with any particular chemical process machine or any particular set of actions.

For the convenience of the user, steps may be clustered into groups of steps having a common characteristic, such as a common function. For example, referring to FIG. 3, a step group box 306 contains a list of step groups, such as "Parameter Definition," "Inlets," and "Mixer Control." Each step group contains one or more steps. A step box 308 contains the list of steps within the step group that is currently selected within the step group box 306. For example, as shown in FIG. 3, the step group "Inlets" is currently selected within the step group box 306. As a result, the steps within the step group "Inlets" are displayed within the step box 308. Such steps include "Solution Source Close," "Solution 1 Open," and "Solution 2 Open." The "Action" field 304g of a step may be edited by selecting the appropriate step group in the step group box 306 and by then selecting the desired step in the step box 308. It should be appreciated that the use of step groups is provided merely as an example and does not constitute a limitation of the present invention.

The "Value" field 304h specifies a value that is associated with the "Action" field 304g of the step. For example, if the action performed by a step is to set an alarm, the "Value" field 304h may specify a value at which the alarm is to be triggered (i.e., an alarm limit). The type and range of values that may be provided in the "Value" field 304h of a step may vary depending upon the action to be performed by the step. In general, the "Value" field 304h may be seen as providing a value that further specifies the action to be performed by the step.

The "EGU" field 304i of a step specifies the engineering units associated with the "Value" field 304h, if any. For example, referring to FIG. 3, it can be seen that the value of the "EGU" field 304i of step 302a is "psig," indicating that the units of the value −10 is psig. Not all actions may require or allow a value to be provided for the "EGU" field 304i.

The "Comments" field 304j provides the user with the ability to optionally associate a textual comment with a step. Data stored in the "Comments" field 304j is not transmitted to the programmable logic controller 116 and may include any information desired by the user.

The "Label" field 304a of a step may be used to assign a textual label to the step. Other steps may refer to a step using its label, in a manner similar to labeled statements in assembly language or higher-level languages such as C and C++. For example, a first step may conditionally branch to a second step, in which case the first step may identify the second step by its label. In the particular example shown in FIG. 3, none of the steps 302a–g have labels.

The user may make execution of a step conditional upon the satisfaction of one or more criteria. For example, as shown in FIG. 3, the "Criteria 1" field 304b may be used to optionally specify a first criterion for a step. If such a first criterion is specified, the step will only execute if the first criterion is satisfied. The first criterion may be any of a variety of criteria. For example, the first criterion may require that the "Value" field 304h of the step (described in more detail below) fall within a particular range of values. More generally, a criterion may be any property of the chemical process machine 118 or any event that may occur within the chemical process machine 118, such as the total amount of time the machine 118 has been running, whether a certain pump in the machine 118 is enabled or disabled, whether the operator has acknowledged an alarm, or whether certain process values (such as pH or conductivity) have reached a specified setpoint.

The user may also optionally specify a second criterion for a step by providing a value for a "Criteria 2" field 304d, and by using the "Bool" field 304c to specify a Boolean connector to connect the "Criteria 1" field 304b and the "Criteria 2" field 304d. The "Criteria 2" field 304d may contain any criterion, as described above with respect to the "Criteria 1" field 304b. The "Bool" field 304c may, for example, have a value of "AND" or "OR". If the value of a step's "Bool" field 304c is "AND," then the step will only execute if the criteria specified in the "Criteria 1" field 304b and the "Criteria 2" field 304d are true. If the value of a step's "Bool" field 304c is "OR," then the step will execute if either of the criteria specified in the "Criteria 1" field 304b and the "Criteria 2" field 304d is true.

The user interface 300 of the operation editor 104 may be used to create operations that include variable steps, fixed steps, or combinations thereof. For example, the current operation shown in FIG. 3 includes five variable steps 302a–e and two fixed steps 302f–g. The meaning of "variable" and "fixed" steps will be described in more detail below with respect to the procedure editor 106. For now it will merely be said that a variable step may subsequently be edited by a user after an operation containing the step has been incorporated into a procedure, and that a fixed step may not be so edited.

The "Parameter" field 304e and the "Global" field 304f are associated with variable steps and will now be described in more detail. If the "Parameter" field 304e of a step is empty, then the step is a fixed step. For example, as shown in FIG. 3, the "Parameter" field 304e of steps 302f and 302g are empty. Therefore, steps 302f and 302g are fixed steps. In contrast, the "Parameter" field 304e of steps 302a–e contain a value (i.e., "process"). Steps 302a–e are therefore variable steps. The user may use the user interface 300 to specify whether a particular step is a variable step by selecting an appropriate value for the step's "Parameter" field 304e. Some types of steps may be either variable or fixed steps (by either assigning or not assigning a value to their "Parameter" fields), while other types of steps may only be variable steps.

Some kinds of variable steps may be input by the user using the user interface 300 in other ways. For example, in one embodiment, a variable criterion is inserted into an operation by selecting "Parameter Criteria" for the value of the step's "Criteria 1" field 304b. The value of "Parameter Criteria" acts as a temporary placeholder for an actual criterion that may subsequently be specified by the user using the procedure editor 106, as described in more detail below.

The "Global" field 304f of a step specifies whether the step may be used as a global default variable, as described in more detail below. The "Global" field 304f is a binary field, having a value, for example, of either "yes" or "no." The user may specify a value of the "Global" field 304f of a step using the user interface 300 by, for example, checking the corresponding checkbox to specify a value of "yes" and leaving the checkbox unchecked to specify a value of "no." The "Global" field 304f is only applicable to variable steps.

Figure 4:
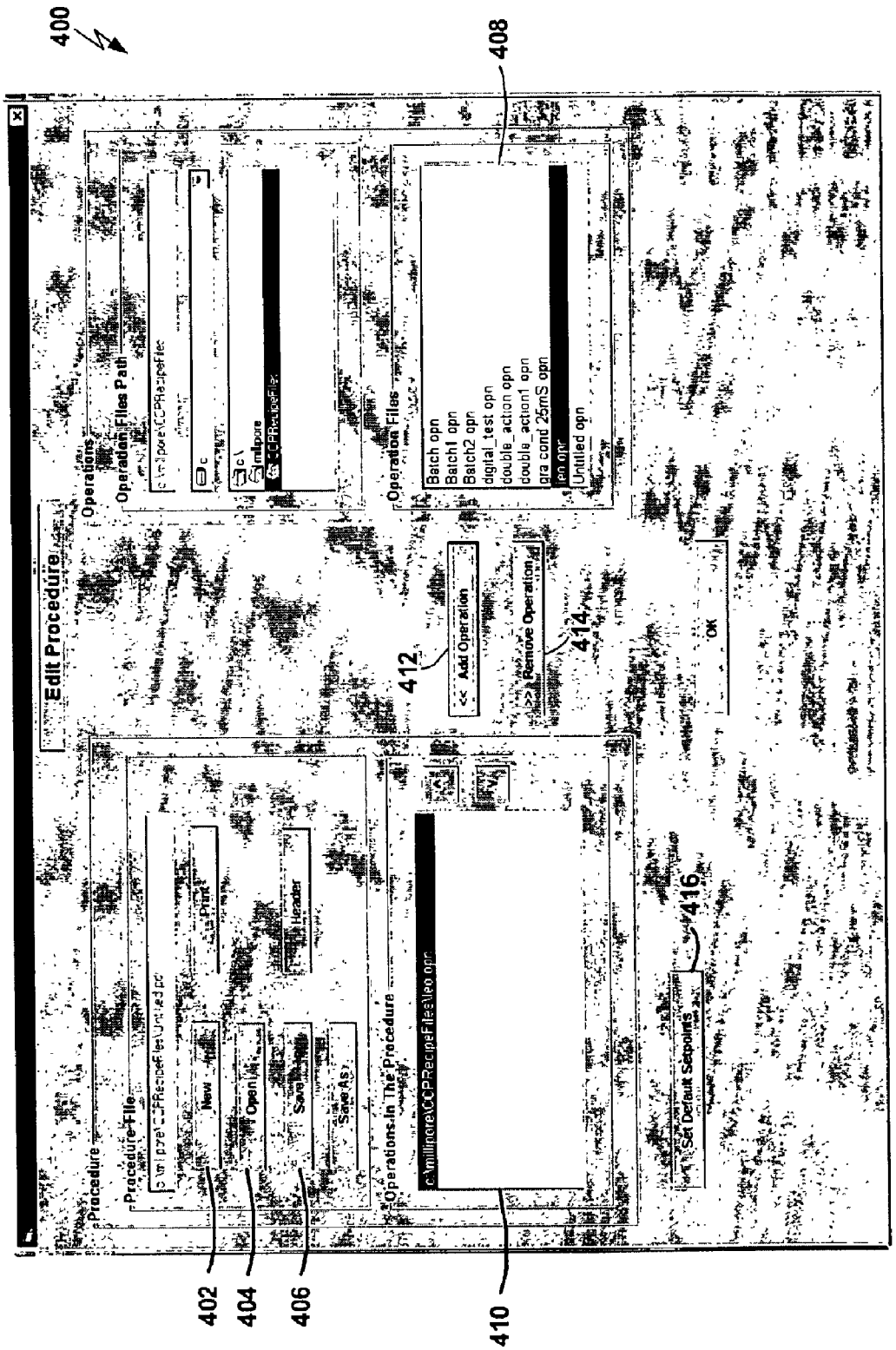
FIG. 4 is a diagram of a graphical user interface that is used by a procedure editor according to one embodiment of the present invention.

Having described in general how the user interface 300 of the operation editor 104 may be used to create operations 110, one embodiment of the procedure editor 106 will now be described. In one embodiment of the present invention, the procedure editor 106 provides a graphical user interface that a user of the computer 102 may use to edit the procedures 112. Referring to FIG. 4, an example of such a user interface 400 is shown.

The user interface 400 includes a button 402 for creating a new procedure (i.e., for adding an empty procedure to the procedures 112 shown in FIG. 1), a button 404 for opening an existing one of the procedures 112 for editing in the procedure editor 106 using the user interface 400, and a button 406 for saving the procedure that is currently being edited using the user interface 400. The procedure that is currently being edited using the user interface 400 is referred to herein as the "current procedure."

As described above, a procedure includes a sequence of one or more operations to be executed in sequence. An operations box 410 in the user interface 400 displays a list of the operations contained within the current procedure. An operation files box 408 displays a list of the operations 110. Any one of the operations 110 may be added to the current procedure by selecting the filename of the desired operation in the operation files box 408 and clicking on an "Add Operation" button 412. Any number of operations 110 may be added to the current procedure in this manner. An operation may be removed from the current procedure by selecting the filename of the operation in the operations box 410 and clicking on a "Remove Operation" button 414.

A user may use the procedure editor 106 to edit variable steps in any of the operations contained within the current procedure. For example, referring to FIG. 4, the user may select an operation to edit by selecting the filename of the operation within the operations box 410 and double clicking on the filename.

Figure 5:
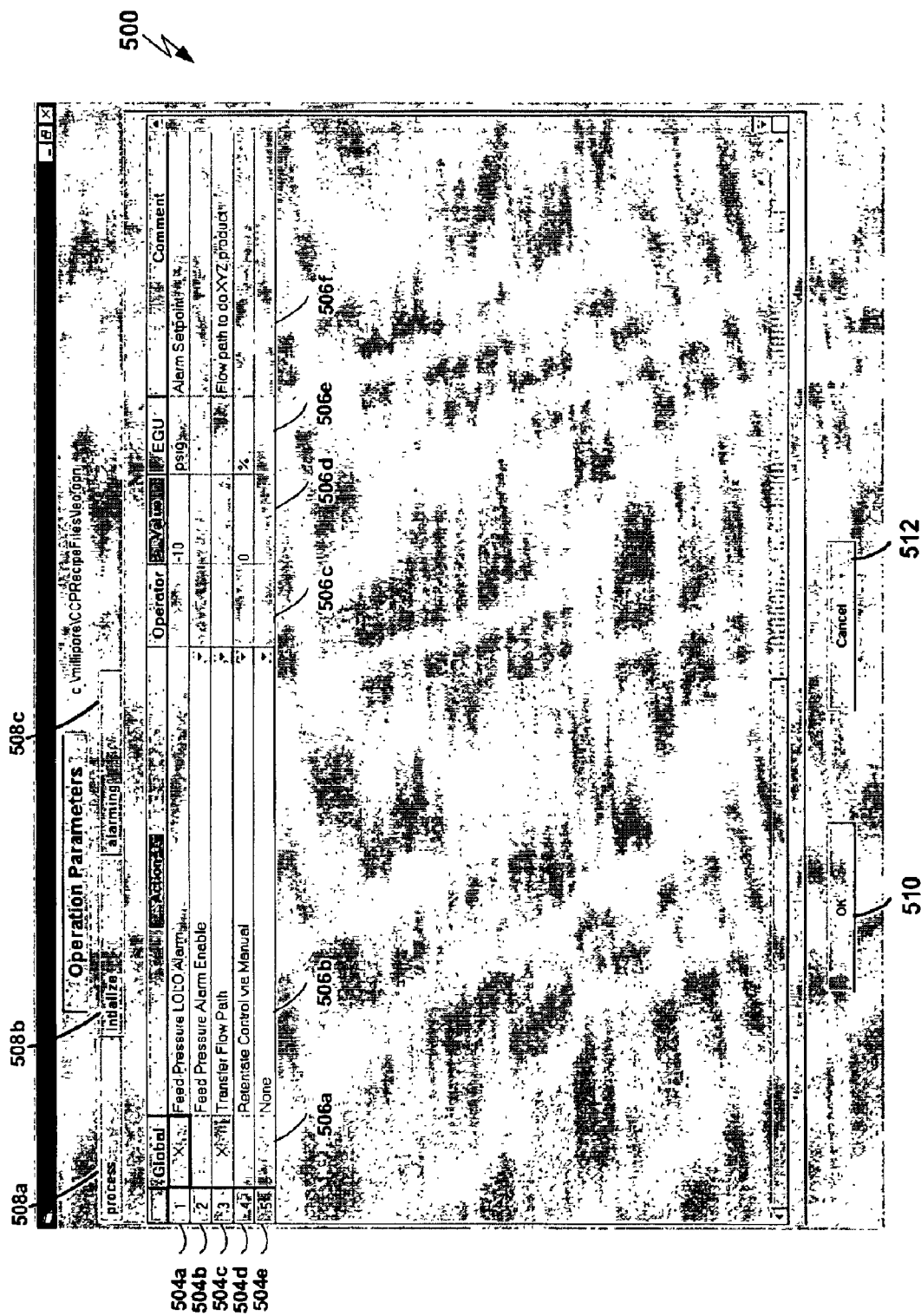
FIG. 5 is a diagram of a graphical user interface that is used by a procedure editor to edit variable steps in an operation according to one embodiment of the present invention.

Referring to FIG. 5, the procedure editor 106 may display a user interface 500 for editing steps within the selected operation in response to double clicking on the filename of the selected operation. The user interface 500 includes a region 502 in which the variable steps of the selected operation are displayed in the form of a spreadsheet that includes rows 504a–e and columns 506a–f. Each of rows 504a–e represents a step in the selected operation and each of columns 506a–f represents a field in the steps. As a result, rows 504a–e may be referred to below simply as "steps" and columns 506a–f may be referred to simply as "fields" for ease of reference.

In the particular example shown in FIG. 5, the selected operation is the same as the operation shown in FIG. 3. Steps 504a–e in FIG. 5 correspond to steps 302a–e in FIG. 3. Note in particular that the user interface 500 shows only the variable steps of the selected operation, and not the fixed steps (i.e., steps 302f–g of FIG. 3). In the example shown in FIG. 5, three tabs 508a–c are provided for displaying variable steps having different values in their "Parameter" fields. For example, in FIG. 3 the "process" tab 508a is selected. As a result, the user interface 500 displays those variable steps of the selected operation for which the value of the "Parameter" field 304e (FIG. 3) is equal to "process." Similarly, selecting the "initialize" tab 508b would cause the user interface 500 to display those variable steps of the selected operation for which the value of the "Parameter" field 304e is equal to "initialize." It should be appreciated that the use of tabs 508a–c is provided merely for purposes of example and does not constitute a limitation of the present invention.

The user may use the user interface 500 to edit variable fields of the steps 504a–e. The fixed fields of the steps 504a–e are illustrated in FIG. 5 with a hatched background, while the variable fields of the steps 504a–e are illustrated with a white background. Consider, for example, step 504a. As shown in FIG. 5, only the "Value" field 506d of step 504a is variable, while the remaining fields 506a–c and 506e–f are fixed. As a result, the user interface 500 allows the user to edit the data in the "Value" field 506d of step 504a, but not the data in the other fields of the step 504a. The user interface 500 may provide any means for editing the variable fields of the step 504a–e, such as conventional text boxes, check boxes, and drop-down lists.

Although in the examples described above, a variable step may include one or more variable fields and one or more fixed fields, this does not constitute a limitation of the present invention. Rather, all of the fields of a variable step may be variable.

There may be multiple types of variable steps. For example, a variable step may be an analog setpoint. The step 502a is an example of such an analog setpoint. In one embodiment, only the "Value" field 506d of an analog setpoint step is variable, while the other fields are fixed. For example, as shown in FIG. 5, the "Value" field 506d of step 504a is variable, allowing the user to edit the alarm limit of the step. The user may not, however, edit the "Action" field 506b or other fields of such a step.

Another type of variable step is a discrete action step. The step 504b is an example of such a step. In one embodiment, the user may choose one of two different values for the "Action" field 506b of such a step. For example, with respect to step 504b, the user may select a value of either "Feed Pressure Alarm Enable" or "Feed Pressure Alarm Disable" for the value of the "Action" field 506b of the step. The user may not edit any other fields of a discrete action step. Steps that involve binary actions, such as enabling/disabling of alarms and closing/opening of values, may be designated as discrete action steps.

Another type of variable step is a named action list. The step 504c is an example of such a step. If a step is of the named action list type, then the user may select a value for the step's "Action" field 506b from among a predetermined list of named actions. For example, referring to FIG. 5, it can be seen that the named action "Transfer Flow Path" has been selected as the value of the "Action" field 506b for the step 504c. Clicking on the "Action" field 506b of the step 504c will cause the user interface 500 to display a list of named actions from which the user may select. The remaining fields of the step 504c may not be edited by the user.

Returning temporarily to FIG. 3, to create a step of the named action list type using the user interface 300 of the operation editor 104, the user selects as the value of the step's "Action" field 304g the name of a named action list. For example, the name "Flow Path" (shown in the step group box 306) is the name of a named action list. It can be seen in FIG. 3 that "Flow Path" has been chosen as the value of the "Action" field 304g of step 302c. There may be several named action lists from which to choose. Selecting "Flow Path," or the name of another named action list, as the value of a step's "Action" field 304g designates the step as being of the named action list type, and defers the choice of the actual action to be performed by the step to the user of the procedure editor 106, as described above. The set of named action lists that are available for selection by the user may be specified by the configuration file 114.

Another type of variable step is a named action list with a value. The step 504d is an example of such a step. If a step is of the named action list with a value type, then the user may select a value both for the step's "Action" field 506b (from among a predetermined list of named actions) and a value for the step's "Value" field 506d. For example, referring to FIG. 5, it can be seen that the named action "Retentate Control via Manual" has been selected as the value of the "Action" field 506b for the step 504d, and that the value of zero has been entered as the value of the "Value" field 506d of the step 504d. The remaining fields of the step 504c may not be edited by the user.

Another type of variable step is a variable criterion. The step 504e is an example of such a step. One example of a way in which a user may use the operation editor 104 to insert a variable criterion into an operation is described above with respect to FIG. 3. When such a step (such as the step 504e) is displayed within the user interface 500 of the procedure editor 106, the user may select a particular criterion to associate with the step by selecting a criterion from a drop-down list (not shown) of available criteria.

Upon making any desired changes to the variable steps 504a–e, the user may save the changes to the current procedure by clicking on an "OK" button 510 or cancel the changes by clicking on a "Cancel" button 512. If the user saves the changes to the current procedure, the changes are saved to the current procedure (such as by modifying a procedure data structure described below with respect to FIG. 6) without affecting other procedures that incorporate the current operation, as described in more detail below.

It was mentioned above with respect to FIG. 3 that certain variable steps may be designated as global variable steps. In one embodiment, the procedure editor 106 allows the user to apply the values of all global variable steps in the first operation in a procedure to corresponding variable steps in the remaining operations in the procedure. For example, referring again to FIG. 3, note that step 302a has been designated as a global variable step. The action of step 302a is "Feed Pressure LOLO Alarm" and the value of the step is –10. Assume for purposes of example that the operation illustrated in FIG. 3 is the first operation in a procedure that includes several operations. Because the step 302a is designated as a global variable step, the user may apply the value of –10 to all steps in subsequent operations in the procedure that have an action of "Feed Pressure LOLO Alarm" by clicking on the "Set Default Setpoints" button 416 in the user interface 400.

The description above describes how to create and edit operations 110, and how to create and edit procedures 112 by combining one or more operations 110 in sequence and by optionally editing steps within the combined operations. Execution of the procedures 112 by the chemical process machine 118 will now be described in more detail.

Assume, for purposes of example, that the user desires to execute the procedure 112a on the chemical process machine 118. The user may select the procedure 112a for execution in any of a variety of ways. For example, the procedure editor 106 may provide a user interface (not shown) for selecting one of the procedures 112 for execution. Such a user interface may take any of a variety of forms, such as an "Execute Procedure" button or menu choice that may be selected by the user.

Upon selecting one of the procedures (in this example, procedure 112a), the procedure editor 106 or other component may translate the steps in the procedure 112a into instructions that may be understood by the programmable logic controller 116. For example, as shown in FIG. 2, each of the steps 302a–g in an operation may include a number of fields 304a–j, each of which may contain a textual, Boolean, numeric, or other symbolic value. Each of the steps 302a–g may be stored within the operations 110 using such textual, Boolean, numeric, or symbolic values or in some other form. The form in which the operations 110 are stored may not, however, be suitable for transmission to and execution by the programmable logic controller 116.

In one embodiment of the present invention, the procedure editor 106 uses a configuration file 114 to translate the steps contained in the operations 110 into instructions that are suitable for transmission to and execution by the programmable logic controller 116. The configuration file 114 may, for example, include a translation table that maps textual action names (such as those shown in the "Action" field 304g of steps 302a–g of FIG. 3) to numerical instruction codes that are executable by the programmable logic controller. The configuration file 114 may contain other information that enables the procedure editor 106 to translate each of the steps in an operation into equivalent codes that are executable by the programmable logic controller 116. The process of translating the steps in the operations 110 into instruction codes suitable for execution by the programmable logic controller is similar to the process of compiling a high-level programming language such as C into machine code that is executable by a processor such as an Intel Pentium processor.

It should be appreciated that different configuration files may be used in conjunction with different chemical process machines. As a result, the same operation editor 104 and procedure editor 106 may be used with a variety of chemical process machines. To use the operation editor 104 and procedure editor 106 with a particular chemical process machine, it is necessary only to provide a configuration file that corresponds to the chemical process machine. This is advantageous because it allows all of the beneficial features of the operation editor 104 and the procedure editor 106 to be used with a wide variety of chemical process machines without requiring that the operation editor 104 and procedure editor 106 themselves be modified for use with each chemical process machine.

Upon translating the steps in the operations of the procedure 112a using the configuration file 114, the procedure editor 106 may transmit the resulting instructions to the programmable logic controller 116 for execution. In response, the programmable logic controller 116 may cause the chemical process machine 118 to execute the instructions; thereby carrying out the procedure 112a specified by the user using the operation editor 104 and the procedure editor 106.

The configuration file 114 may be used by the operation editor 104 and/or procedure editor 106 for a variety of other purposes. For example, the configuration file 114 may define a textual list of the names of actions that may be performed by the chemical process machine 118, and may also group the action names into step groups. Referring again to FIG. 3, the operation editor 104 may use this information to provide the list of step group names in the step group box 306 and to provide the appropriate list of step names in the step name box 308 when the user has selected a particular step group name. The configuration file 114 may also provide a list of criteria names, and the operation editor 104 and/or procedure editor 106 may allow the user to select from a drop-down list of such names when selecting a criterion name (e.g., in field 304b or 304d). Similarly, the configuration file 114 may provide minimum and/or maximum values for the "Value" field 304h of a step based on the value of the step's "Action" field 304g, and may prohibit the user from entering values that exceed the maximum value or fall below the minimum value. In these ways, the operation editor 104 and/or procedure editor 106 may use the information contained within the configuration file 114 to assist the user in programming operations that are compatible with the particular chemical process machine 118 to be controlled.

Operations 110, procedures 112, and configuration file 114 are shown in FIG. 1 and described generally above as being represented using data structures that may be stored in a computer-readable memory, such as a Random Access Memory (RAM) of computer 102 and/or a hard disk drive. It should be appreciated that the operations 110, procedures 112, and configuration file 114 may be represented and stored in any of a variety of ways that will be apparent to those of ordinary skill in the art.

For example, each of the operations 110 may be stored in a separate file on a conventional hard disk drive. The file may have a file format similar to that of a conventional spreadsheet file format suitable for storing information about each of the steps, such as the information displayed in region 320 of FIG. 3. Operations 110 may, however, be stored using any suitable data structure. For example, actions within steps may be stored using numerical action codes rather than using textual action descriptions such as those shown in the "Action" field 304g of FIG. 3.

Similarly, procedures 112 may be represented and stored using any suitable data structure. For example, referring to FIG. 6, in one-embodiment procedures may be represented using a data structure 600. The list includes m elements 602a–m, corresponding to the m operations within the corresponding procedure. The elements are arranged in an order corresponding to the order of the operations in the procedure. Elements 602a–m include references 604a–m (pointers) to the operations within the procedure. If, for example, operations 110 are each saved in individual files, each of references 604a–m may be a filename of the file in which the corresponding operation is stored.

Figure 6:
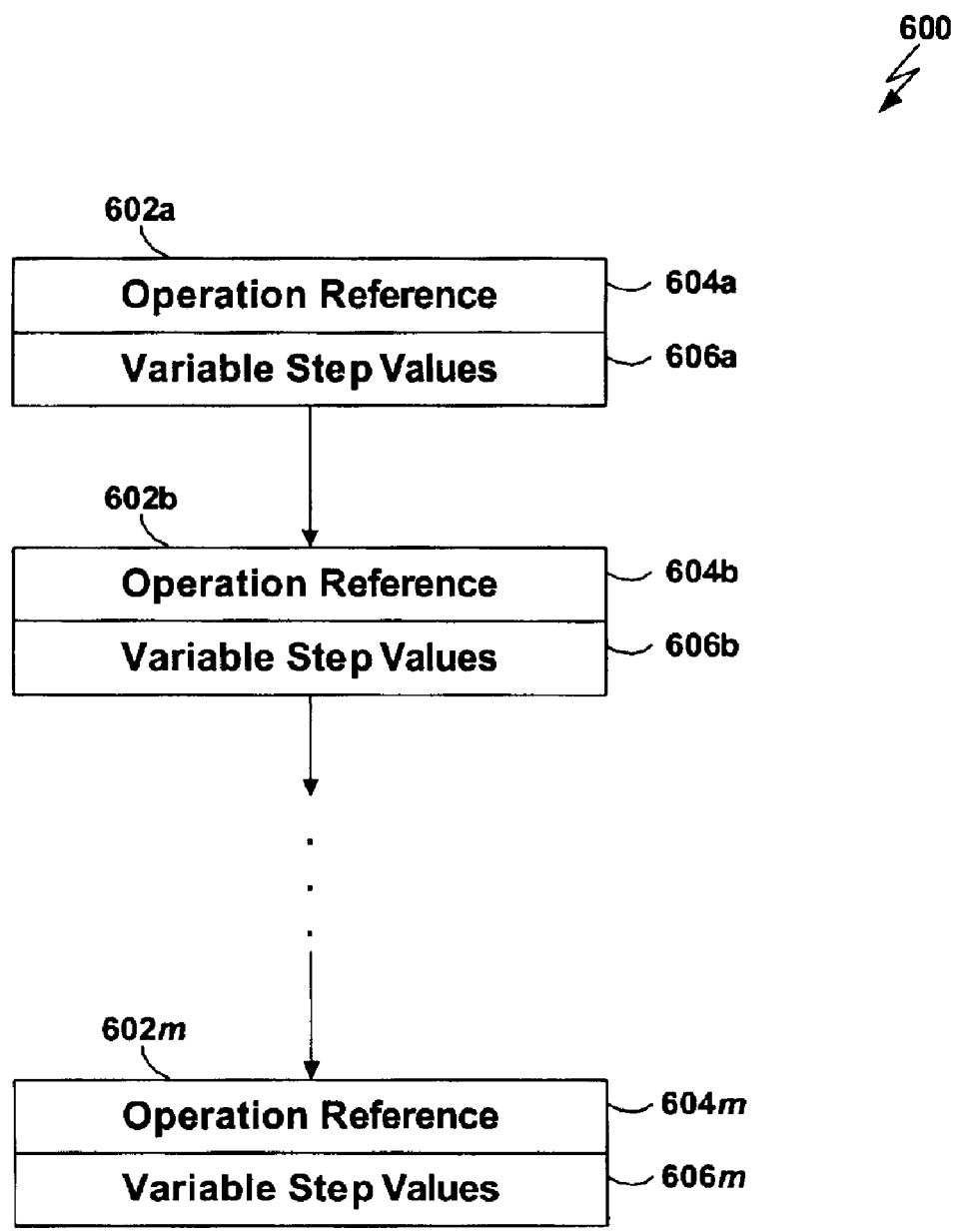
FIG. 6 is a block diagram of a data structure that is used to represent a procedure according to one embodiment of the present invention.

As described above, an operation may include both variable steps and fixed steps. As shown in FIG. 6, elements 602a–m may also include variable step values 606a–m, which store the values of the variable fields of steps in the corresponding operations. For example, assume that element 602a in FIG. 6 corresponds to the operation depicted in FIG. 5. As shown in FIG. 5, the operation includes a total of six variable fields: the "Value" field of step 504a, the "Parameter" field of step 504b, the "Parameter" field of step 504c, the "Parameter" field of step 504d, the "Value" field of step 504d, and the "Parameter" field of step 504e. The remaining fields of the steps 504a–e of the operation depicted in FIG. 5 are fixed steps. In one embodiment, the variable step values 606a of the element 602a shown in FIG. 6 contains the values of the six variable fields of the steps 504a–e of the operation depicted in FIG. 5. The values of the fixed fields of the steps 504a–e are stored in the operation referenced by the operation reference 605a. The operation file may be viewed as a template that contains the values of fixed fields in the operation, while the variable step values 606a of the procedure data structure 600 contains the values of variable fields in the operation.

The variable step values 606a, although illustrated in generalized form in FIG. 6, may be represented using any appropriate data structure, as will be apparent to those of ordinary skill in the art. For example, the variable step values 606a may itself comprise a list, wherein each element of the list includes: (1) a pointer to or other identifier of a variable field in the corresponding operation, and (2) a particular value for the variable field. In this way, the variable step values 606a–m stored in the procedure data structure 600 may be combined with the fixed step values stored in the corresponding operation files when, for example, the procedure is downloaded to the programmable logic controller 116 for execution by the chemical process machine 118.

Among the advantages of various embodiments of the invention are one or more of the following.

One advantage of various embodiments of the operation editor 104 is that it allows some steps within an operation to be designated as variable steps and other steps to be designated as fixed steps. This feature is advantageous for a variety of reasons. For example, the ability to designate certain steps within an operation as variable and other steps as fixed enables the developer of an operation to prevent end users of the operation from modifying steps that have been tested and determined to work properly. The developer may, for example, develop an operation and test it to ensure that it complies with legal requirements, industry standards, or other criteria. The ability to make some or all of the steps in the operation fixed enables the developer to prevent end users from modifying the fixed steps, thereby preventing the user from introducing errors into the operation that may cause it to malfunction or to violate applicable legal requirements or industry standards.

The ability, provided by various embodiments of the operation editor 104, to designate some steps as fixed but other steps as variables, provides the developer of the operations 110 with a degree of flexibility that may be beneficial for a variety of reasons. For example, although it may be desirable to make certain steps (or portions thereof) fixed for the reasons described above, it may also be desirable to allow the end user of the operations 110 to modify certain steps or portions thereof. For example, although it may be necessary for an alarm to be enabled by a step at a certain point in an operation, it may be desirable to allow the end user to modify the particular alarm limit, since an appropriate alarm limit may vary depending upon the particular end user application. The operation editor 104 provides the developer of the operations 110 with the flexibility to make such portions of particular steps variable, while keeping other parts of the operation fixed.

Furthermore, the procedure editor 106 enforces the choices made by the operations developer by only allowing the end user to edit those portions of the steps of an operation that have been designated by the developer as variable. The distinction between fixed and variable steps may be further enforced by packaging the operation editor 104 and the procedure editor 106 separately, whereby the operation editor 104 is targeted at developers of the operations 110 and the procedure editor 106 is targeted at end users. Similarly, within a particular organization, the operation editor 104 may be provided only to individuals responsible for developing and/or maintaining the operations 110, while the procedure editor 106 may be provided to end users.

In addition to preventing end users from damaging the operations 110 or making unauthorized changes to them, the procedure editor 106 also simplifies the process of editing operations 110 from the point of view of the end user. In particular, the use of a user interface such as the user interface 500 shown in FIG. 5, in which only the variable steps of an operation are displayed to the end user, simplifies the task of editing the operation. For example, as described above, each of operations 110 often includes hundreds or thousands of steps, only a few of which the user may desire to modify. Using conventional systems, the user must typically search through the many steps in an operation to identify the steps to be modified, which can be very time-consuming. In contrast, embodiments of the operation editor 104 described herein display to the user only those steps within an operation that have been designated as variable, thereby eliminating the need to search through an operation for steps to modify. Typically, only a small number of steps in an operation are variable, and in many cases all of them may be viewed on a computer monitor simultaneously.

Furthermore, as described above, according to various embodiments of the operation editor 104 certain fields of a particular variable step may be designated as variable fields, while other fields in the same step may be designated as fixed fields. For example, referring to FIG. 5, the step 504a has a single variable field (the "Value" field 506d), while the remaining fields are fixed. The variable fields may be designated as variable and the fixed fields as fixed in any of a variety of ways. For example, in one embodiment, the procedure editor 106 determines which fields in a variable step are variable automatically based on the type of the variable step. For example, the procedure editor 106 may be pre-programmed to determine that only the "Value" field 506d of an analog setpoint variable step, such as the step 504a, is a variable field and that the remaining fields are fixed. In an alternative embodiment, the user of the operation editor 104 may individually designate whether each field in a particular step is variable or fixed. In general, a "variable step" is defined herein as any step having at least one variable field.

The ability to define certain fields within a step as variable and other steps as fixed is advantageous because it strikes a balance between providing the flexibility gained by providing the user with the ability to modify steps and the need to prevent the user from modifying portions of an operation that have been tested or should not be modified for some other reason. As shown in FIG. 5, in one embodiment the procedure editor 106 shows all fields of a variable step to the user, and distinguishes variable from fixed fields by displaying fixed fields with a gray background and variable fields with a white background. Displaying all fields, even fixed fields, to the user assists the user in determining what function is performed by a step and in making any desired changes to the step. Making the fixed fields unmodifiable in the user interface, however, prevents the user from editing fixed fields. The user interface 500, therefore, provides an efficient and convenient way for users to edit variable fields in operations.

Another, related, advantage of the procedure editor 106 is that it allows the user to directly edit steps in operations contained within the procedure, unlike previous systems in which the user was typically required to copy the operation files used by the procedures and to edit the copied files, in order to prevent the changes from propagating to other procedures that incorporate the same operations. Because the procedure editor 106, however, stores the changes made by the user in the procedure data structure 600 shown in FIG. 6 without modifying the referenced operation files, it is not necessary for the user or the procedure editor 106 to copy the referenced operation files before editing them. Rather, any number of procedures may be created that incorporate the operations 110, and the user may edit variable fields of steps in the operations of such procedures, without making any changes to the operations 110 themselves or requiring the files containing the operations 110 to be copied. As a result, use of the procedure editor 106 may reduce the proliferation of operation files that was associated with previous systems.

More generally, the speed and ease with which operations 110 and procedures 112 may be edited using various embodiments of the operation editor 104 and the procedure editor 106 may be advantageously used to speed the process of developing of biopharmaceuticals, thereby allowing them to reach the market more quickly.

A further advantage of various embodiments of the operation editor 104 and the procedure editor 106 are that they may be used with any chemical process machine. As described above, the configuration file 114 may contain information about the steps that may be performed by the particular chemical process machine 118. The operation editor 104 and procedure editor 106 may therefore be designed to be generic and to use the information in the configuration file 114 to tailor their various user interfaces (such as the user interfaces 300, 400, and 500) to the particular chemical process machine being programmed.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Although five operations 110a–e and three procedures 112a–c are shown in FIG. 1 for purposes of example, there may be any number of operations or procedures, in any combination. Furthermore, the operations 110 and procedures 112 may be distributed in any manner across any number and kind of storage devices.

Although an operation has been described herein as an ordered sequence of steps and a procedure has been described herein as an ordered sequence of operations, it should be appreciated that steps within an operation and operations within a procedure may also execute concurrently. For example, in one embodiment of the present invention, steps within an operation may be grouped into two or more "phases," each of which consists of a sequence of steps. Multiple phases within an operation may operate concurrently and communicate with each other.

Although particular examples are described above of techniques that may be used to specify that particular steps within an operation are variable, it should be appreciated that these examples do not constitute limitations of the present invention. Rather, any techniques may be used to specify that particular steps within an operation are variable or fixed, or to specify that particular fields within a step are variable or fixed. For example, although in the examples shown and described above a step is designated as variable by specifying a value for the step's "Parameter" field, a step may be designated in other ways, such as by checking a "Parameter" checkbox (not shown). Similarly, the data structure that is used to represent and store a step may include a separate field that is used to specify whether the step is a variable step or a fixed step.

Elements and components described herein may be further divided into additional components or joined together to form fewer components for performing the same functions. The techniques described above may be implemented, for example, in hardware, software, firmware, or any combination thereof. The techniques described above with respect to the operation editor 104, procedure editor 106, and programmable logic controller 116 may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. In a system comprising a computer for controlling a membrane filtration process, wherein a memory of the computer contains an operation comprising a plurality of executable steps in the process, a method comprising steps of:
   (A) identifying a first subset of the plurality of executable steps as fixed steps;
   (B) identifying a second subset of the plurality of executable steps a variable steps; and
   (C) providing to a user of the system an interface through which the variable steps, but not the fixed steps, may be modified.

2. The method of claim 1, wherein the membrane filtration process comprises a chromatography process.

3. The method of claim 1, wherein the membrane filtration process comprises a tangential flow filtration process.

4. The method of claim 1, wherein the operation comprises a data structure residing in the memory of the computer, wherein the data structure includes a designation of each of the plurality of executable steps in the process as either a fixed step or a variable step, and wherein:
   The step (A) comprises a step of identifying as fixed steps those executable steps in the process that are designated by the data structure as fixed steps; and
   The step (B) comprises a step of identifying as variable steps those executable steps in the process that are designated by the data structure as variable steps.

5. The method of claim 1, wherein the step (C) comprises step of:
   (C)(1) displaying to the user at least some of the variable steps and none of the fixed steps; and
   (C)(2) providing means to the user for editing the at least some of the variable steps.

6. The method of claim 5, further comprising a step of:
   (C)(3) displaying to the user at least some of the fixed steps in a form that is not editable by the user.

7. In a system comprising a computer for controlling a membrane filtration process, a method comprising a step of:
   (A) producing, within a memory of the computer, an operation comprising a plurality of executable steps in the process, by performing steps of:
      (1) producing within the operation at least one fixed step that may not be edited by a user of the computer; and (2) producing within the operation at least one variable step that may be edited by a user of the computer.

8. The method of claim 7, further comprising a step of:
(B) providing to the user of the system an interface through which the at least one variable step, but not the at least one fixed step, may be modified.

9. In a system comprising a computer for controlling a membrane filtration process, wherein a memory of the computer contains an operation comprising plurality of executable steps in the process, and wherein the plurality of executable steps comprises at least one variable step and at least one fixed step, a method comprising steps of:
(A) receiving input from a user indicating a modification to the at least one variable step; and
(B) modifying the at least one variable step to reflect the input received from the user in step (A).

10. The method of claim 9, further comprising a step of:
(C) prior to the step (A), providing to the user an interface through which the at least one variable step, but not the at least one fixed step, may be modified.

11. In a system comprising a computer for controlling a membrane filtration process, wherein a memory of the computer contains an operation comprising a plurality of executable steps in the process, and wherein the plurality of executable steps comprise at least one variable step and at least one fixed step, an apparatus comprising:
means for receiving input from a user indicating a modification to the at least one variable step; and
means for modifying the at least one variable step to reflect the input received from the user.

12. The apparatus of claim 11, further comprising:
means for selecting the at least one variable step from among the plurality of executable steps in the process; and
means for displaying to the user the at least one variable step.

13. In a system comprising a computer for controlling a membrane filtration process, wherein a memory of the computer contains a procedure data structure comprising pointers to a plurality of operation data structures, and wherein each of the plurality of op ration data structures comprises at least one fixed step in the process and at least one variable step in the process, a method comprising steps of:
(A) providing to a user of the system a first interface through which user may select one of the plurality of operation data structures; and
(B) providing to the user a second interface through which the at least one variable step, but not the at least one fixed step, of the selected operation data structure may be modified.

14. In a system comprising a computer for controlling a membrane filtration process, wherein a memory of the computer contains a procedure data structure comprising at least one pointer to at least one operation data structure, and wherein the at least one operation data structure comprises at least one fixed step in the process and at least one variable step in the process, a method comprising steps of:
(A) receiving input from a user indicating a modification to the at last one variable step; and
(B) modifying the procedure data structure to reflect the input received from the user in step (A).

15. The method of claim 14, wherein the step (B) comprises a step of storing the modification indicated by the user in the procedure data structure.

16. The method of claim 14, wherein the procedure data structure comprises a file stored in a file system accessible to the computer.

17. The method of claim 14, further comprising a step of:
(C) prior to the step (A), providing to the user an interface through which the at least one variable step, but not the at least one fixed step, may be modified.

18. In a system comprising a computer for controlling a membrane filtration process, wherein a memory of the computer contains a procedure data structure comprising at least one pointer to at least one operation data structure, and wherein the at least one operation data structure comprises at least one fixed step in the process and at least one variable step in the process, an apparatus comprising:
means for receiving input from a user indicating a modification to the at least one variable step; and
means for modifying the procedure data structure to reflect the input received from the user.

19. The apparatus of claim 18, wherein the means for modifying comprises a step of storing the modification indicated by the user in the procedure data structure.

20. In a system comprising a computer for controlling a membrane filtration process, a procedure data structure residing in a memory of the computer, the procedure data structure comprising:
at least one pointer to an operation data structure within the memory, wherein the operation data structure comprises data for specifying at least one fixed step and at least one variable step in the process; and
at least one datum specifying the at least one variable step.

* * * * *